(12) United States Patent
Lefebvre et al.

(10) Patent No.: US 9,183,439 B2
(45) Date of Patent: Nov. 10, 2015

(54) METHOD OF SEARCHING FOR PARAMETERIZED CONTOURS FOR COMPARING IRISES

(75) Inventors: Thierry Lefebvre, Clamart (FR); Nadege Lempriere, Velizy (FR); Sonia Garcia, Gif-sur-Yvette (FR); Bernadette Dorizzi, Gif-sur-Yvette (FR)

(73) Assignee: Thales (FR)

( * ) Notice: Subject to any disclaimer, the term of this patent is extended or adjusted under 35 U.S.C. 154(b) by 50 days.

(21) Appl. No.: 14/118,874

(22) PCT Filed: May 11, 2012

(86) PCT No.: PCT/EP2012/058835
§ 371 (c)(1),
(2), (4) Date: Feb. 5, 2014

(87) PCT Pub. No.: WO2012/156333
PCT Pub. Date: Nov. 22, 2012

(65) Prior Publication Data
US 2014/0226875 A1 Aug. 14, 2014

(30) Foreign Application Priority Data
May 19, 2011 (FR) ..................................... 11 01526

(51) Int. Cl.
*G06K 9/00* (2006.01)
*G06T 7/00* (2006.01)

(52) U.S. Cl.
CPC .......... *G06K 9/00597* (2013.01); *G06K 9/0061* (2013.01); *G06T 7/0083* (2013.01); *G06T 7/0089* (2013.01); *G06T 2207/20061* (2013.01); *G06T 2207/20116* (2013.01); *G06T 2207/30041* (2013.01)

(58) Field of Classification Search
CPC ....................... G06K 9/00597; G06K 9/00281
See application file for complete search history.

(56) References Cited

U.S. PATENT DOCUMENTS

| | | | |
|---|---|---|---|
| 5,291,560 A | 3/1994 | Daugman | |
| 8,155,395 B2* | 4/2012 | Kobayashi et al. | 382/117 |
| 2005/0180635 A1 | 8/2005 | Trifonov et al. | |
| 2006/0098867 A1* | 5/2006 | Gallagher | 382/167 |
| 2009/0252382 A1 | 10/2009 | Liu et al. | |

OTHER PUBLICATIONS

A. L. Yuille et al., "Feature Extraction from Faces Using Deformable Templates", Harvard Robotics Laboratory, Division of Applied Science, Harvard University, 1989, pp. 104-109.
J. Koh et al., "A Robust Iris Localization Method Using an Active Contour Model and Hough Transform", International Conference on Pattern Recognition, 2010, pp. 2852-2856.

(Continued)

*Primary Examiner* — Siamak Harandi
(74) *Attorney, Agent, or Firm* — Baker Hostetler LLP

(57) ABSTRACT

A method for detecting outlines for iris comparison comprises a step of selecting N candidate outlines of circular form by applying a circle search technique to an image of edges of an iris. It also comprises a step of optimizing the form and the position of the N candidate outlines, the optimized candidate outlines being determined by using parametric models, a set of parameters being determined for each candidate outline by minimizing a quantity of energy E(C). The method also comprises a step of selecting the best optimized candidate outline.

10 Claims, 4 Drawing Sheets

(56) References Cited

OTHER PUBLICATIONS

S. C. Zhu et al., "Region Competition: Unifying Snakes, Region Growing, and Bayes/MDL for Mutiband Image Segmentation", EE Transaction on Pattern Analysis and Machine Intelligence, Sep. 1996, vol. 18, No. 9., pp. 884-900.

Andrew Blake et al: "Chapter 2—Active shape models" In: "Active Contours", Apr. 1, 1998, Springer, XP05501535.

M. A. Fischler et al., "Random Sample Consensus: A Paradigm for Model Fitting with Applications to Image Analysis and Automated Cartography", Communications of the ACM, Jun. 1981, vol. 24, No. 6., pp. 381-395.

Andrew Blake et al: "Chapter 1, Introduction" In: "Active Contours", Apr. 1, 1998, Springer, XP05501535.

* cited by examiner

METHOD OF SEARCHING FOR PARAMETERIZED CONTOURS FOR COMPARING IRISES

CROSS-REFERENCE TO RELATED APPLICATIONS

This application is a National Stage of International patent application PCT/EP2012/058835, filed on May 11, 2012, which claims priority to foreign French patent application No. FR 1101526, filed on May 19, 2011, the disclosures of which are incorporated by reference in their entirety.

FIELD OF THE INVENTION

The invention relates to a method for searching for parameterized outlines for iris comparison and applies notably to the field of biometrics and more particularly iris comparison.

BACKGROUND

The objectives of biometric techniques are to identify living beings. These techniques can be used in the context of applications requiring a certain security level, such as, for example, controlled access to sensitive sites.

For this, a morphological analysis applied to the individuals is implemented in order to identify the physical characteristics that are specific to them. This analysis is based, for example, on the iris or the fingerprints.

When it comes to analyzing the iris, an exemplary existing analysis method is the so-called Daugman method, described in the U.S. Pat. No. 5,291,560. This method allows comparison between several iris-representative digital samples and makes it possible to then determine whether these samples correspond to one and the same individual. For this, the aim of a first step is to segment and normalize the irises and then there is a step which aims to extract therefrom a binary code to compare it to a reference. The extraction of the binary code is done by applying a phase demodulation around points of application to transform the texture of the iris into a binary code.

During the segmentation implemented for the analysis methods, the outlines of the iris are usually considered to be circular. Thus, circles delimiting the outlines of the iris are sought. This search for outlines is a critical processing operation in the recognition process because an error of a few pixels on the estimation of the center or of the radius of the circles significantly reduces the performance levels of the system and degrades the reliability of the recognition. Two methods are usually used to find these circles.

In the context of the Daugman method, an integro-differential circle detection operator is used. This operator depends on three parameters $(x_c, y_c, r)$ corresponding to the coordinates of the center of the circle and to its radius, and is evaluated over the entire digital image of the eye for a significant range of radii. Following the application of the operator to the image, two sets of three parameters $(x_c, y_c, r)$ are retained, these two sets corresponding respectively to the inside and outside outlines of the iris.

The main drawback with this method is that the integro-differential operator must be calculated over a significant portion of the image and on a discrete grid limiting the accuracy that can be achieved for the description of the outline. Furthermore, this operator is sensitive to local minima, said minima being introduced for example by artifacts such as portions of eyelid.

A second method for finding the circles delimiting the iris is the Wildes method. Firstly, a filter is applied to the digital image of the eye to implement a detection of edges. For this, a Canny filter can be used. A circular Hough transform is then applied to the image resulting from the detection of edges to find the circles from the detected edges. The main drawback with this method is that it depends strongly on the edge detection method used. Furthermore, the circular Hough transform is an operation that is very costly in terms of computation time.

These two outline detection methods have also been extended for more complex outline types than circles to be able to take into account, for example, outlines of elliptical form. However, in the case of ellipses, the Daugman operator and the elliptical Hough transform significantly increase the computation complexity. Thus, the least squares method is usually used in practice because it is less costly in terms of computation power, even though it is less robust.

SUMMARY OF THE INVENTION

One aim of the invention is notably to mitigate the above-mentioned drawbacks.

To this end, the subject of the invention is a method for detecting outlines for iris comparison. It comprises a step of selecting N candidate outlines of circular form by applying a circle search technique to an image of edges of an iris. It also comprises a step of optimizing the form and the position of the N candidate outlines, the optimized candidate outlines being determined by using parametric models, a set of parameters being determined for each candidate outline by minimizing a quantity of energy E(C). It also comprises a step of selecting the best optimized candidate outline.

According to one aspect of the invention, the circle search technique used to select N candidate outlines of circular form is a circular Hough transform.

Alternatively, the circle search technique used to select N candidate outlines of circular form can be the RANSAC method, the acronym RANSAC being derived from "RANdom SAmple Consensus".

The quantity of energy E(C) is minimized by using, for example, the gradient descent method.

According to one aspect of the invention, the quantity of energy E(C) associated with a candidate outline C is equal to the sum of the edge energy $E_{edge}(C)$ and of the region energy $E_{region}(C)$ of said outline.

The energy of edges is determined by using, for example, the following expression:

$$E_{edge}(C) = \int_0^{2\pi} \vec{\nabla}[I(\vec{X}_p(\theta))] \cdot \vec{n}_\theta d\theta$$

in which:

$\vec{n}_\theta$ represents the normal unitary vector outgoing at the angular parameter point $\theta$;

$\vec{\nabla}[\ ]$ represents the gradient function;

$\vec{X}_p(\theta)$ represents a column vector whose elements are the coordinates $x(\theta)$, $y(\theta)$ of a point of the image;

$I(\vec{X}_p(\theta))$ represents the intensity of the image at the point associated with the vector $\vec{X}_p(\theta)$.

The region energy $E_{region}(C)$ is determined by using, for example, the following expression:

$$E_{region}(C) = -\int_{Rin} \log P_{in}(I(X))dX - \int_{Rout} \log P_{out}(I(X))dX$$

in which:
$R_{in}$ represents the region of the digital image of the eye inside the outline;
$R_{out}$ represents the region of the digital image of the eye outside the outline;
$P_{in}()$ and $P_{out}()$ correspond to the probabilities for a pixel of intensity $I(X)$ of the image to be located inside or outside the outline.

The parametric model is, for example, a circle model, the set of parameters associated with this parametric model then comprising 3 parameters.

Alternatively, the parametric model is an ellipse model, the set of parameters associated with this parametric model then comprising 5 parameters.

The best outline out of the N optimized candidate outlines is, for example, the one for which the energy $E(C)$ has the lowest value.

Another subject of the invention is a method for detecting inside and outside outlines of the iris of an eye. For this, the method described previously is applied a first time to detect the inside outline and a second time to detect the outside outline.

The advantage offered by the invention is, notably, that it makes it possible to use the Hough transform for a low resolution which reduces the complexity of the calculations. Furthermore, the implementation of a local optimization limits the impact of the detection of edges since the work is done directly on the image.

BRIEF DESCRIPTION OF THE DRAWINGS

Other features and advantages of the invention will become apparent from the following description, given as a nonlimiting illustration, and in light of the appended drawings in which.

DETAILED DESCRIPTION

Figure 1:
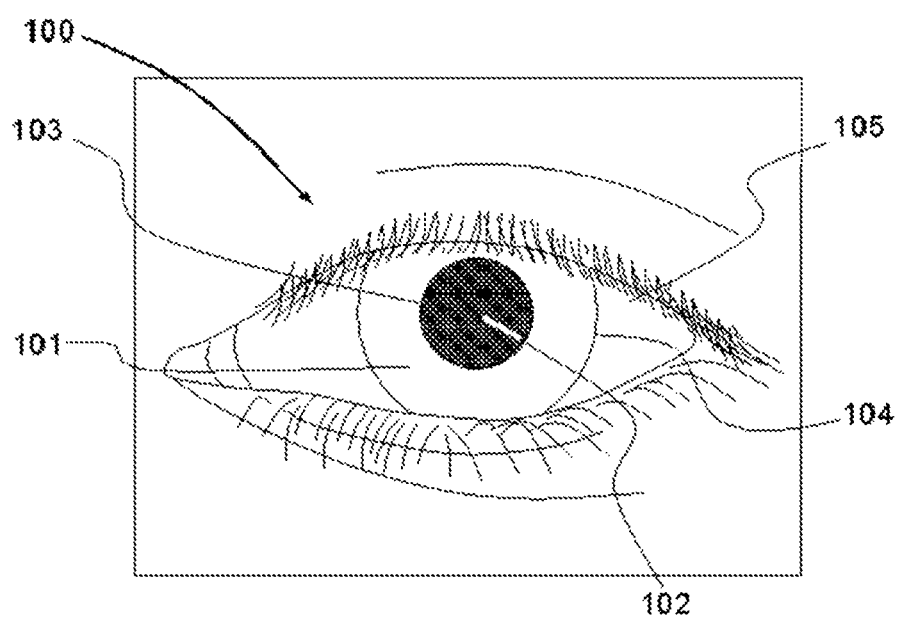
FIG. 1 shows an eye and the area usually used for iris comparison.

FIG. 1 shows an eye and the area usually used for iris comparison. On the eye 100 given as example, the iris 101 and the pupil 102 can be distinguished. An area defined by the surface between two outlines 103, 104 comprising the visible part of the iris makes it possible to segment the iris, that is to say isolate it from the white of the eye 105 and from the pupil 102.

Figure 2:
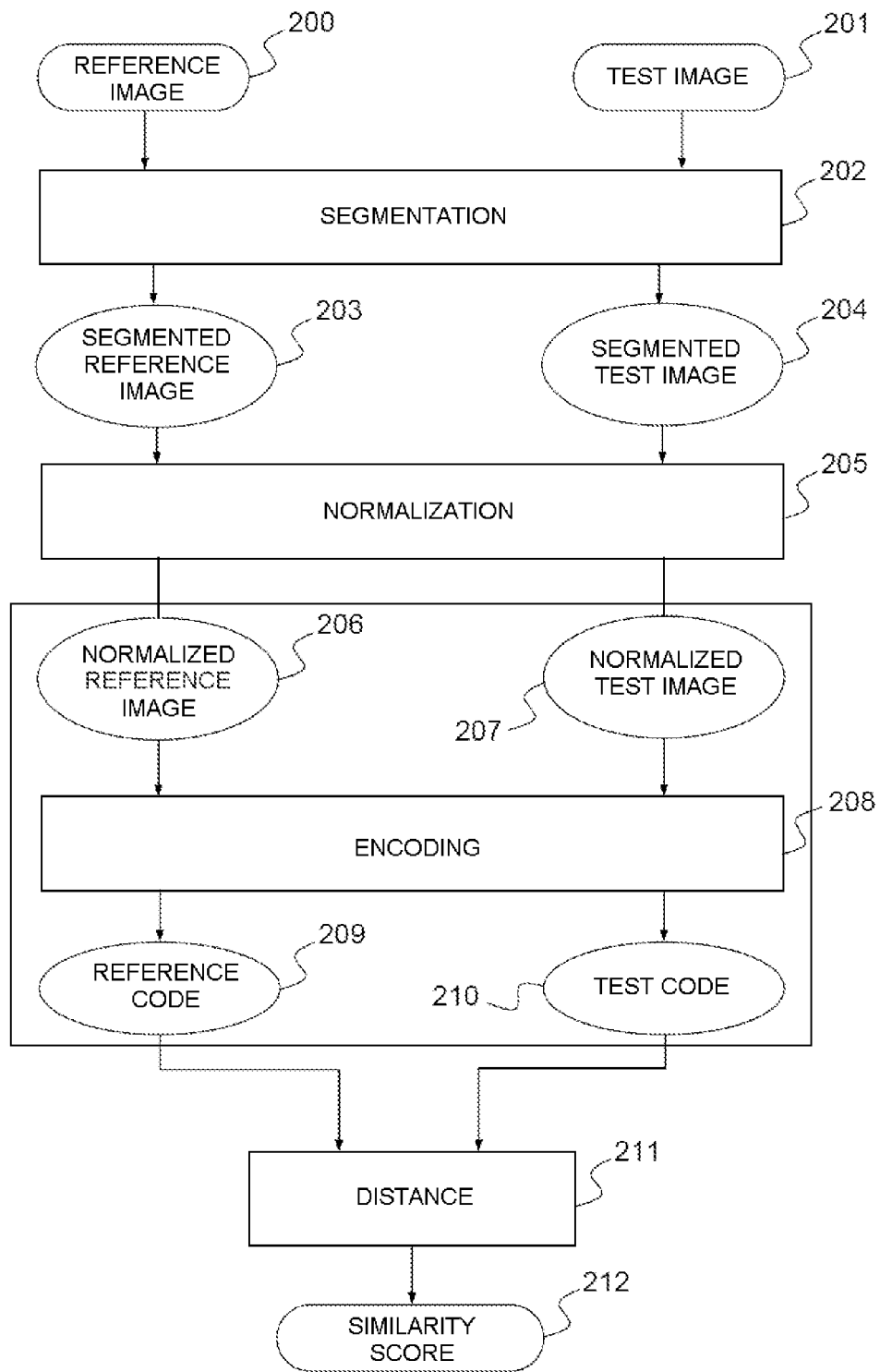
FIG. 2 presents a diagram illustrating the operation of the iris comparison Daugman method.

FIG. 2 presents a diagram illustrating the operation of the Daugman iris comparison method.

The objective of this method is to determine whether two iris images belong to the same person. Thus, a test iris image 201 is compared to a reference iris image 200. The aim of the first step is to segment 202 the irises of these two images, that is to say to isolate each iris from the white of the eye and from the pupil. The segmentation step 202 makes it possible to distinguish in the image the pixels belonging to the iris which makes it possible to generate a segmentation mask. This mask can be used to find the edges of the iris on the digital image of the eye and it is then possible to search for the parametric description of the inside and outside outlines of the iris in order to perform the normalization.

The reference and test images after segmentation 203, 204 are then normalized 205. The normalization step 205 consists in rolling out the iris so as to obtain a strip which contains the texture of the iris and whose form is independent of pupil dilatation.

An encoding step 208 makes it possible to obtain a reference code 209 for the reference image and a test code 210 for the test image.

These codes are then compared by calculating, for example, their Hamming distance 211. The result of this comparison is called similarity score 212 and makes it possible to decide whether the test iris corresponds to the reference iris, the correspondence being established if the similarity score exceeds a predetermined value.

Figure 3:
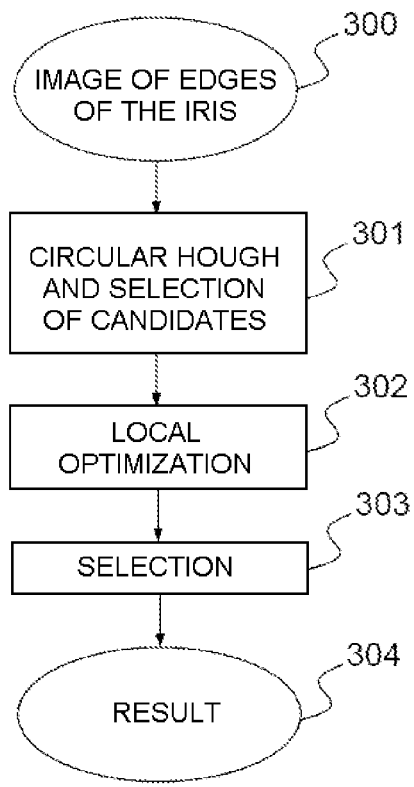
FIG. 3 schematically illustrates the steps of the method according to the invention.

FIG. 3 schematically illustrates the steps of the method according to the invention. This method makes it possible to determine, accurately, rapidly and fairly simply, the inside and outside outlines of the iris by implementing a parameterized model optimization, that is to say an optimization from a curve generated by a set of parameters. This detection of iris outlines can thus be implemented into two stages, a first stage for detecting the inside outline, that is to say the separation between the pupil and the iris, and a second stage for detecting the outside outline, that is to say the separation between the iris and the white of the eye.

This processing operation is applied after a segmentation mask has been obtained that identifies the region of the iris and that makes it possible to obtain a first estimation of the inside and outside outlines. This segmentation mask is obtained by the conventional segmentation methods used in iris recognition. Thus, the method according to the invention corresponds to an intermediate processing between the segmentation and the normalization of the digitized iris.

The first step 301 of the method consists in determining a set of N candidate outlines. For this, an image of edges of the iris 300 is used. A circular Hough transform 301 is, for example, applied to this image in order to find the parameters representative of the N candidate outlines of circular form.

The aim of a second step 302 is to locally optimize the form and the position of the candidate outlines. Following this optimization, a third step 303 selects the circle to be retained as inside or outside outline.

Figure 4:
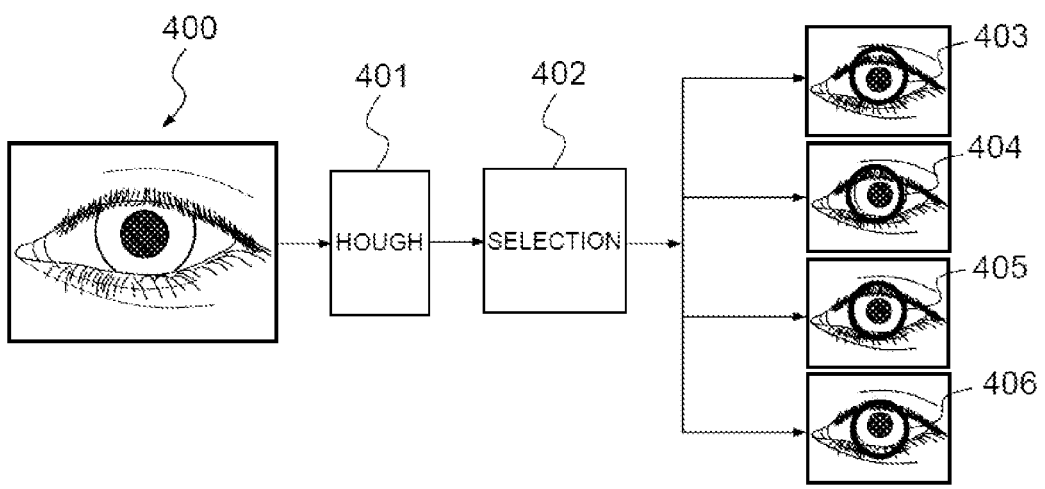
FIG. 4 illustrates the step of selecting N candidate outlines of circular form.

FIG. 4 illustrates the step of selecting N candidate outlines of circular form. For this, a circular Hough transform 401 can be applied to the segmentation mask 400. The N best circles 403, 404, 405, 406 within the meaning of this transform, that is to say the circles of greatest weight, are then selected and stored. As an alternative to the Hough transform, another circle search technique, called "circle fitting" technique, can be used, such as, for example, the RANSAC method, RANSAC being an acronym for "RANdom SAmple Consensus". In the example of the figure, four circles are selected.

Figure 5:
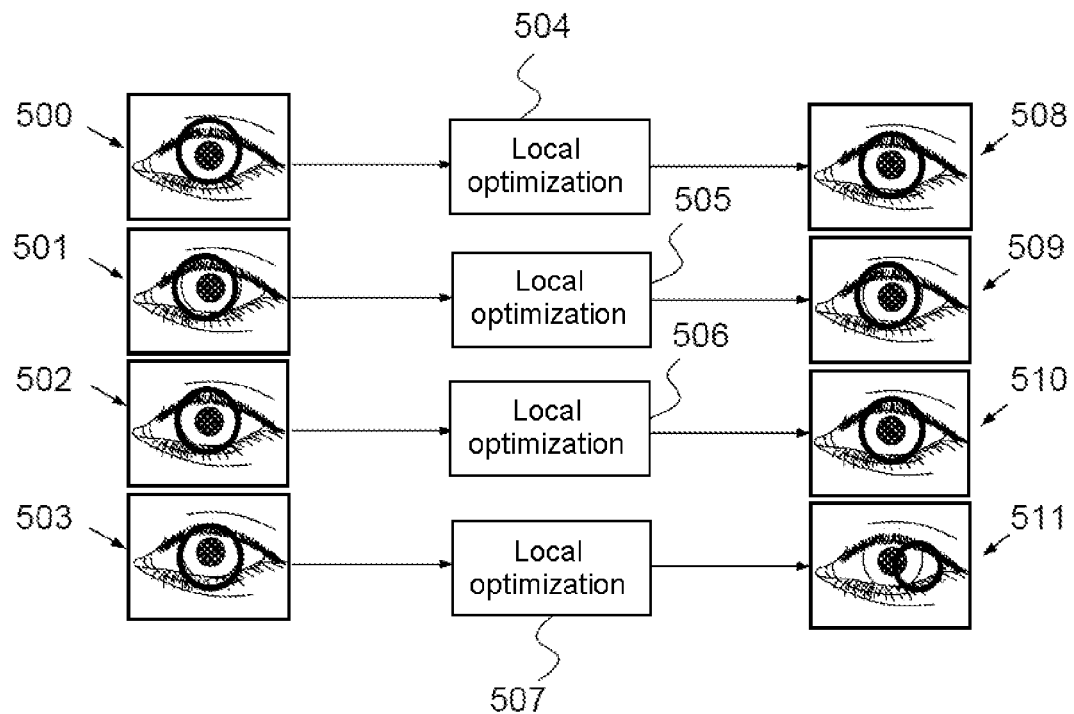
FIG. 5 illustrates the local optimization step.

FIG. 5 illustrates the local optimization step of the method according to the invention. A local optimization 504, 505, 506, 507 is performed on each of the N circles 500, 501, 502, 503 retained following the application of the circular Hough transform.

The local optimization of the selected outlines consists in making the candidate outlines evolve so that they minimize a quantity of energy E(C) defined along these outlines, said outlines being defined by parametric models.

In order to minimize the energy E(C), the conventional gradient descent method can be used for a given parametric model. Thus, a set of parameters associated with a model of parameters minimizing the energy E(C) will then be determined for each candidate outline. As examples, a set of three parameters $(x_c, y_c, r)$ will be determined if a circle parametric model is used and a set of five parameters $(x_e, y_e, a, b, \phi)$ will be determined if an ellipse parametric model is used.

In the case of the circle, the parametric model is, for example, as follows:

$$x(\theta) = x_c + r\cos(\theta)$$

$$y(\theta) = y_c + r\sin(\theta) \quad (1)$$

in which:
$x(\theta), y(\theta)$ represent the coordinates of the points that make up the circle for the angles $\theta$;
$x_c, y_c$ represent the coordinates of the center of the circle;
$r$ represents the radius of the circle.

For the ellipse case, the following parametric model can be used:

$$x(\theta) = x_e + a\cos(\theta)\cos(\phi) - b\sin(\theta)\sin(\phi)$$

$$y(\theta) = y_e + a\cos(\theta)\sin(\phi) + b\sin(\theta)\cos(\phi) \quad (2)$$

in which:
$x(\theta), y(\theta)$ represent the coordinates of the points that make up the ellipses for the angle $\theta \in [0, 2\pi]$;
$x_e, y_e$, represent the coordinates of the center of the ellipse;
$a, b$ represent the great axis and small axis parameters of the ellipse;
$\phi$ represents the rotation parameter.

As an example, the energy E(C) can be determined by combining two types of energy associated with the active outlines. The first type is the edge energy $E_{edge}(C)$ and the second type is a region energy $E_{region}(C)$. Thus, the quantity of energy E(C) to be minimized can be determined by using the following expression:

$$E(C) = E_{edge}(C) + E_{region}(C) \quad (3)$$

The energy of edges will make it possible to prioritize the areas with strong gradients. In other words, the contribution of the energy of edges $E_{edge}(C)$ to E(C) will make it possible to guide the candidate outlines toward the areas of strong gradients.

The energy of edges can be expressed by using the following expression:

$$E_{edge}(C) = \int_0^{2\pi} \vec{\nabla}[I(\vec{X}_p(\theta))] \cdot \vec{n}_\theta d\theta \quad (4)$$

in which:
$\vec{n}_\theta$ represents the normal unitary vector outgoing at the angular parameter point $\theta$;
$\vec{\nabla}[\ ]$ represents the gradient function;
$\vec{X}_p(\theta)$ represents a column vector whose elements are the coordinates $x(\theta), y(\theta)$ of a point of the image;
$I(\vec{X}_p(\theta))$ represents the intensity of the image at the point associated with the vector $\vec{X}_p(\theta)$.

The energy of edges $E_{edge}(C)$ can be determined simply from the parameters of the outline.

The calculation of the region energy $E_{region}(C)$ will make it possible to adapt the outline by maximizing the disparities between the regions inside and outside the outline. In other words, the contribution of the energy of edges $E_{region}(C)$ to E(C) will contribute to guiding the outline toward the outside if working from inside the iris toward the inside if starting from outside the iris. This is usually referred to as region competition method.

The energy $E_{region}(C)$ can be determined by using the following expression:

$$E_{region}(C) = -\int_{Rin} \log P_{in}(I(X)) dX - \int_{Rout} \log P_{out}(I(X)) dX \quad (5)$$

in which:
$R_{in}$ represents the region of the digital image of the eye inside the outline;
$R_{out}$ represents the region of the digital image of the eye outside the outline;
$P_{in}(\ )$ and $P_{out}(\ )$ correspond to the probabilities for a pixel of intensity $I(X)$ of the image to be located inside or outside the outline. These terms can be estimated beforehand and/or updated during the gradient descent.

The details for deriving the region energy $E_{region}(C)$ can be found in the literature, notably in the article by S. C. Zhu and A. Yuille entitled *Region Competition: Unifying Snakes, Region Growing, and Bayes/MDL for Multiband Image Segmentation*, IEEE Transactions on Pattern Analysis and Machine Intelligence, 1996.

Advantageously, the local optimization means that there is no need to use a fixed pitch grid and that a good resolution is obtained. Furthermore, by using a number of circular candidate outlines as input for the local optimization, it becomes possible to safeguard against local minima which are the main drawback of the variational methods usually employed.

Figure 6:
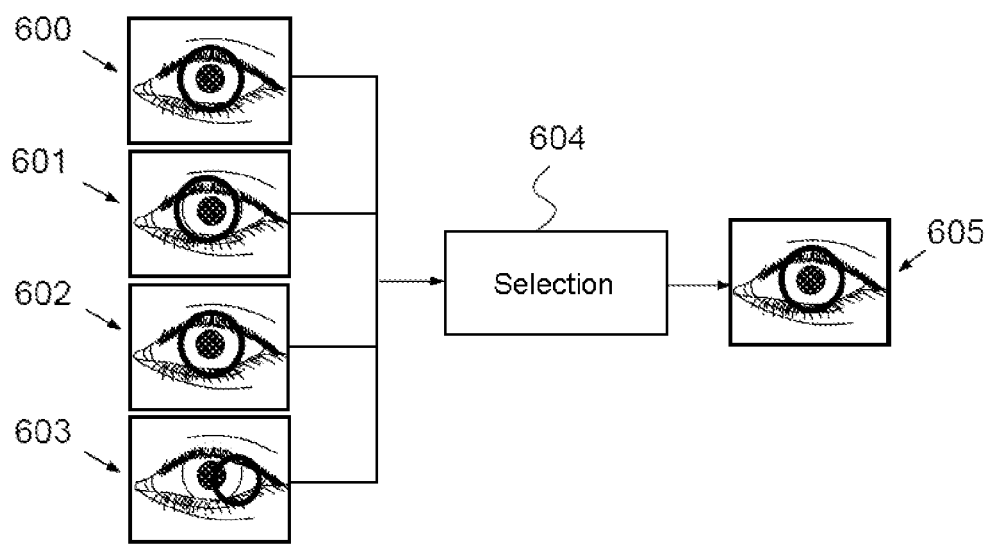
FIG. 6 illustrates the step of selecting the best outline of the after local optimization.

FIG. 6 illustrates a step of selecting the best outline of the after local optimization.

Through the local optimizations described previously and conducted on the N selected candidate outlines, the outlines have been displaced and transformed to be adapted to the outlines actually present in the image. The best outline out of the N optimized candidate outlines 600, 601, 602, 603 still then has to be identified 604. A number of selection methods can be implemented. A first possibility is to take the outline which has the optimal energy value E(C). An alternative is to apply the Daugman operator for each of these outlines and to select the best within the meaning of this operator.

The invention claimed is:

1. A method for detecting outlines for iris comparison, comprising:
   selecting N candidate outlines of circular form by applying a circle search technique to an image of edges of an iris,
   optimizing the form and the position of the N candidate outlines, the optimized candidate outlines being determined by using parametric models, a set of parameters being determined for each candidate outline by minimizing a quantity of energy E(C),
   selecting the best optimized candidate outline
   wherein the quantity of energy E(C) associated with a candidate outline C is equal to the sum of the edge energy $E_{edge}(C)$ and of the region energy $E_{region}(C)$ of said outline.

2. The method for detecting outlines as claimed in claim 1, in which the circle search technique used to select N candidate outlines of circular form is a circular Hough transform.

3. The method for detecting outlines as claimed in claim 1, in which the circle search technique used to select N candidate outlines of circular form is the Random Sample Consensus method.

4. The method for detecting outlines as claimed in claim 1, in which the quantity of energy E(C) is minimized by using the gradient descent method.

5. The method for detecting outlines as claimed in claim 1, in which the energy of edges is determined by using the following expression:

$$E_{edge}(C) = \int_0^{2\pi} \vec{\nabla}[I(\vec{X}_p(\theta))] \cdot \vec{n}_\theta d\theta$$

in which:

$\vec{n}_\theta$ represents the normal unitary vector outgoing at the angular parameter point $\theta$;

$\vec{\nabla}[\ ]$ represents the gradient function;

$\vec{X}_p(\theta)$ represents a column vector whose elements are the coordinates $x(\theta)$, $y(\theta)$ of a point of the image;

$I(\vec{X}_p(\theta))$ represents the intensity of the image at the point associated with the vector $\vec{X}_p(\theta)$.

6. The method for detecting outlines as claimed in claim 1, in which the region energy $E_{region}(C)$ is determined by using the following expression:

$$E_{region}(C) = -\int_{Rin} \log P_{in}(I(X))dX - \int_{Rout} \log P_{out}(I(X))dX$$

in which:

$R_{in}$ represents the region of the digital image of the eye inside the outline;

$R_{out}$ represents the region of the digital image of the eye outside the outline;

$P_{in}(\ )$ and $P_{out}(\ )$ correspond to the probabilities for a pixel of intensity $I(X)$ of the image to be located inside or outside the outline.

7. The method for detecting outlines as claimed in claim 5, in which the parametric model is a circle model, the set of parameters associated with this parametric model then comprising 3 parameters.

8. The method for detecting outlines as claimed in claim 5, in which the parametric model is an ellipse model, the set of parameters associated with this parametric model then comprising 5 parameters.

9. The method for detecting outlines as claimed in claim 1, in which the best outline out of the N optimized candidate outlines is the one for which the energy E(C) has the lowest value.

10. A method for detecting inside and outside outlines of the iris of an eye, wherein the method as claimed in claim 1 is applied a first time to detect the inside outline and a second time to detect the outside outline.

\* \* \* \* \*